United States Patent [19]

Krause et al.

[11] 4,142,543
[45] Mar. 6, 1979

[54] VALVE STEM AND DISC COMBINATION AND METHOD OF ASSEMBLING SAME

[75] Inventors: Richard J. Krause, Addison; Joseph Zaletel, Elmhurst, both of Ill.

[73] Assignee: Henry Valve Company, Melrose Park, Ill.

[21] Appl. No.: 772,231

[22] Filed: Feb. 25, 1977

[51] Int. Cl.² ............................................... F16k 51/00
[52] U.S. Cl. ......................................... 137/15; 85/8.8; 85/9 R; 85/55; 251/85; 251/297; 403/326
[58] Field of Search ............................ 85/8.8, 9 R, 55; 251/84, 85, 88, 297, 357; 403/326, 353; 137/15

[56] References Cited

U.S. PATENT DOCUMENTS

| 1,988,258 | 1/1935 | Yardley | 251/357 |
| 1,991,052 | 2/1935 | Derby | 251/357 |
| 2,470,700 | 5/1949 | Henry | 251/85 |
| 2,718,373 | 9/1955 | Henry | 251/357 |
| 2,848,187 | 8/1958 | Henry | 251/85 |
| 3,282,554 | 11/1966 | Jones | 251/88 |
| 3,326,580 | 6/1967 | Munier et al. | 85/8.8 |
| 3,352,532 | 11/1967 | Mooney et al. | 251/357 |
| 3,700,206 | 10/1972 | Jones | 251/84 |

Primary Examiner—Martin P. Schwadron
Assistant Examiner—G. L. Walton
Attorney, Agent, or Firm—Lockwood, Dewey, Alex & Cummings

[57] ABSTRACT

A valve stem and disc for a disc-type valve assembly are held together by a retaining ring and constructed such that they may be assembled inside a valve housing while avoiding the possibility of the retaining ring binding upon either the stem or disc during assembly. The valve stem includes a truncated conical portion forming its distal end which acts to align the various valve members during assembly. In the method, the retaining ring is mounted on the valve disc first rather than on the valve stem. When the truncated conical end of the valve stem is inserted in the disc so as to spread the retaining ring until mating engagement is reached between the stem, the disc, and the retaining ring. The diameter of the truncated stem distal end is sized to preclude any binding on the retainer ring or disc during assembly.

4 Claims, 3 Drawing Figures

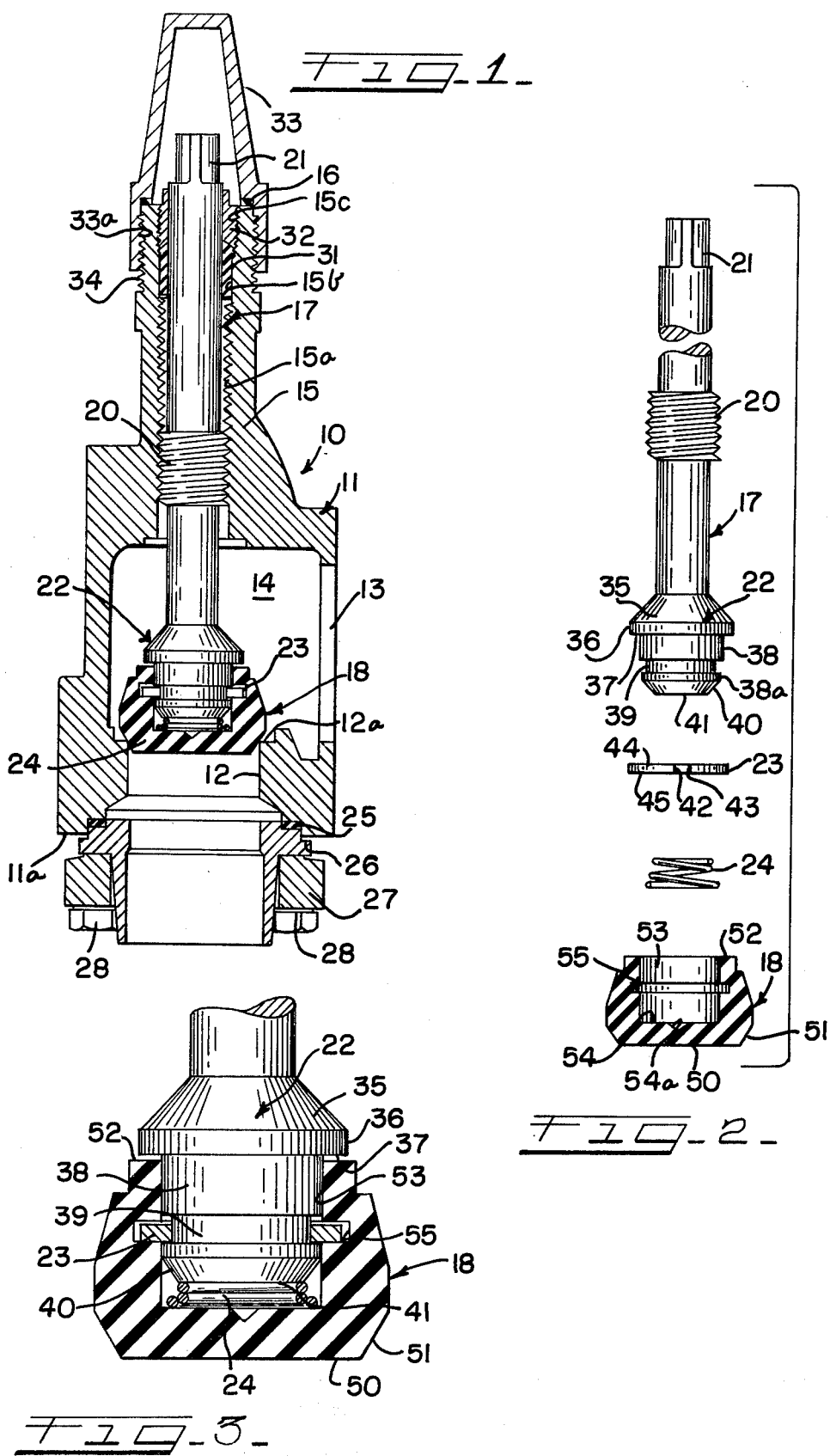

VALVE STEM AND DISC COMBINATION AND METHOD OF ASSEMBLING SAME

BACKGROUND OF THE INVENTION

This invention relates generally to disc-type valve assemblies, and more particularly, to a combination valve stem and valve disc, and to a method of assembling same in a disc-type valve housing.

In disc-type valve assemblies constructed for straight through or right angle flow therethrough, an elongate threaded valve stem is commonly mounted in a threaded valve guide in the valve housing such that the stem distal end extends into the flow passageway. In normal construction, a valve disc is loosely mounted to that distal end of the valve stem. As the stem is threaded further into the flow passageway, the valve disc is positioned to sealingly engage a valve seat which is formed in the valve passageway in axial alignment with the valve guide. The valve disc is preferably loosely fitted to the valve stem to compensate for irregularities in the alignment of the valve assembly parts. Heretofore, in most valve stem-disc mounting arrangements, the valve disc is formed with a hollow mounting portion into which the distal end of the valve stem is inserted. Prior art improvements in valve stem-disc combinations generally relate to either (1) the insertion of the stem into the disc, or (2) the retention of the disc on the stem.

In one known valve stem-disc combination, the disc is held on the valve stem by means of several retainer pins and a retainer ring which holds the pins within radially extending slots in the valve seat disc and with an annular groove positioned adjacent the distal end of the valve stem for receiving the pins. This valve stem-disc combination is a comparatively complicated assembly which is shown and described in U.S. Pat. No. 2,470,700, issued to the assignee to the present application.

Another means of mounting a valve disc upon a valve stem is shown and disclosed in U.S. Pat. No. 3,700,206, issued to the assignee of the present application, wherein the valve disc is a one-piece molded plastic member having a slot therein in which the distal end of the valve stem, which is shaped like a button, is inserted. The valve disc includes several biased arms in the path of insertion which prevent the removal of the valve stem button from the disc once it is inserted therein. In certain instances, discs made of steel are preferable to those made of plastic materials.

In another valve stem-disc combination, the disc includes a valve stem mounting hole which is chamfered or angularly tapered to open toward the top of the hole as a guide for a valve stem to be inserted therein. An annular indent groove is positioned around the circumference of the stem mounting hole inwardly adjacent the chamfered portion. The cylindrical distal end of the valve stem includes a flat end surface which is positioned generally perpendicular to the axis of the stem, and an annular indent groove on the circumference of the stem inwardly adjacent the distal end thereof in which a retaining ring is loosely mounted. As the stem's distal end and the loose retaining ring are inserted into the stem mounting hole of the disc, the chamfered surface of the mounting hole attempts to center the valve stem and the retaining ring for full insertion therein. However, if the loosely fitting retaining ring is positioned off-center in its annular groove, the retaining ring may strike the top of the disc and bind thereon preventing the insertion of the stem into the disc mounting hole until the retaining ring is manually centered in the stem groove.

It is therefore an object of the invention to provide an improved combination valve stem and valve disc for a disc-type valve assembly.

Another object of the invention is the provision of an improved method of mounting a valve disc to a valve stem in a disc-type valve assembly.

A further object of the invention is the provision of a valve stem which is structured to be inserted into a mounting hole in a valve disc without binding on the disc before insertion is complete.

SUMMARY OF THE INVENTION

The invention is directed to a valve assembly which includes an axially extending valve stem and a valve disc including a hollow portion which is positioned on one end of the valve stem. A retaining ring is positioned in retaining engagement between the end of the valve stem and the hollow portion of the disc. A valve disc spring is positioned between the distal end of the valve stem and the bottom of the valve disc hollow portion and biases both the stem and the disc against the retaining ring. The invention is directed to an improvement comprising a truncated conical portion at the distal end of the valve stem which provides for automatic centering of the retaining ring on the valve stem during assembly thereof.

The invention is further directed to a method of mounting a valve stem on a valve disc in a valve assembly wherein the assembly includes a valve housing having a threaded valve stem guide and a valve seat both axially aligned thereon. A valve stem includes a threaded portion mediate the ends thereof and a first annular indent groove positioned around the circumference of the stem adjacent one end thereof. The valve stem further includes a truncated conical surface at the distal end thereof. The valve disc includes a dead-ended hollow cylindrical hole with an annular indent groove positioned around the circumference thereof. An expandable retaining ring is adapted for mounting in the annular grooves and a coil spring is adapted for biasing the disc and the valve stem against the retaining ring. The method comprises the steps of: mounting the retaining ring in the annular indent groove in the valve disc; positioning the spring in the valve disc cylindrical mounting hole; threading the valve stem in the valve guide; positioning the valve disc on the valve seat in the housing; then turning the valve stem in the housing to move the stem distal end into the valve disc cylindrical hole. The conical distal end of the valve stem then expands the retaining ring in the disc annular groove; it also collapses the coil spring in the cylindrical hole; and it aligns the annular groove of the disc with the annular groove of the stem whereby the retaining ring snaps into the annular groove of the stem and biases the disc with the stem.

BRIEF DESCRIPTION OF THE DRAWINGS

The features of the present invention, which are believed to be novel, are set forth with particularity in the appended claims. This invention may best be understood by reference to the following description of a presently preferred embodiment, taken in conjunction with the accompanying drawings, in the several figures of which like reference numerals identify like elements, and in which:

FIG. 1 is a sectional view of a disc-type valve housing in which the combination valve stem, and valve disc made in accordance with the invention are mounted therein;

FIG. 2 is an exploded assembly view of the valve stem and valve disc combination with the valve disc shown in section;

FIG. 3 is an enlarged fragmentary view of the valve disc mounting portion of the valve stem with the valve disc mounted thereon as shown in FIG. 1.

DETAILED DESCRIPTION OF THE PREFERRED EMBODIMENT

Referring to FIG. 1, a disc-type valve assembly is shown generally at 10 and includes a housing 11 having an inlet port 12, an outlet port 13, and a hollow passageway 14 therebetween. A frusto-conical valve seat 12a is positioned at the inward end of inlet port 12. Housing 11 further includes a valve guide portion 15 having a hollow threaded valve guide 15a which is axially aligned with inlet port 12 and extends from the side of passageway 14 opposite inlet port 12 through the valve guide portion 15 to the distal end 15 thereof.

The valve assembly 10 further includes an inlet adapter 26 positioned outwardly adjacent the inlet port 12 for retaining a tubular member (not shown) to the inlet side of the valve assembly 10. A compressive flange 27 provides full circumferential support to the adapter 26 and biases it against the inlet port 12. A plurality of bolts 28-28 maintain the adapter 26 and compressive flange 27 against the gasket 25.

An elongate valve stem, generally indicated at 17, having a threaded portion 20 formed on the stem mediate the ends thereof, is threadedly mounted in the valve guide 15a. A valve disc 18 is mounted on the valve stem 17 at a valve disc mounting generally indicated at 22, at the lower end of the stem. The valve stem further includes a handle mounting 21 at the upper distal end thereof which provides a controlled means of turning the stem in the valve guide 15a. The valve disc 18 is retained on the disc mounting 22 by a retaining ring 23 and a coil spring 24, both positioned between the disc mounting 22 and the valve disc 18 in biased relation thereto.

The valve assembly 10 further includes at the upper end of the valve guide 51a, a packing sealant 31 which is positioned in a cylindrical aperture 15b immediately above valve guide 15a. Sealant 31 is retained therein by an annular packing gland 32 which is threaded to be retained in an upper threaded aperture 15c positioned immediately adjacent the annular top surface 16 of valve guide portion 15. A protective cover 33 may be positioned over the top of valve stem handle mounting 21 and includes an annular threaded portion 33a which threadedly engages an outer threaded surface 34 adjacent the top of valve guide portion 15. Also, protective cover 33 may be discarded if a permanent handle (not shown) is to be positioned on the handle mounting 21.

Referring to FIG. 2, the valve stem 17, the valve disc 18, the retaining ring 23, and coil biasing spring 24 are shown in exploded isolated detail. The valve disc mounting 22 forming the lower distal end of the valve stem 17 includes as its innermost portion an outwardly extending skirt 35. An annular cylindrical surface 36 extends between the bottom border of skirt 35 and the flat annular flange 37, which is positioned in a plane perpendicular to the valve stem axis. Annular flange 37 provides a stop means limiting the insertion of the valve stem mounting 22 into the valve disc 18. A cylindrical wall 38 extends axially from the innermost radial boundary of annular flange 37 toward the distal end of the stem 17. An annular indent groove 39 is positioned mediate the ends of cylindrical wall 38 and extends around the circumference thereof. Indent groove 39 includes a flat cylindrical base and flanged sidewalls perpendicular to that base which extend outwardly to the surface defining cylindrical wall 38. A portion of cylindrical wall 38 is separated from the remainder of wall 38 by the annular groove 39 and is denoted 38a. A truncated or frusto-conical surface 40 extends from cylindrical wall surface 38a to the flat circular distal end surface 41 of the valve stem.

Retaining ring 23 is generally annular in shape, with the exception of a split portion defining spaced end surfaces 42, 43 thereon which allow the retaining ring to be compressed to have a smaller outer diameter or expanded to have a larger inner diameter. End surfaces 42, 43 are rectangular in shape, and are identical with any cross-section taken through retaining ring 23 perpendicular to the plane of the ring. The flat annular upper and lower surfaces 44, 45 respectively, of the retaining ring 23 are the surfaces against which the valve stem 17 and valve disc 18 are biased when mounted together. The inner diameter of the angular retaining ring 23 is sufficiently large to allow the ring to be mounted on indent groove 39 of valve stem 17 without being stressed outwardly by the base of the groove. However, the inner diameter of retaining ring 23 is of a size which provides a close fit with the cylindrical base surface of indent groove 39 when mounted therein.

Coil spring 24 is of conventional tapered configuration having a large base diameter which allows the spring to be inserted into the valve disc 18, and a small upper base diameter which allows the spring to be biased against flat distal end 41 of valve stem 17.

The valve stem disc 18 is preferably made of steel, brass, aluminum, or the like and is generally cup-shaped. Disc 18 includes a flat circular base 50 having a diameter smaller than that of housing inlet port 12. An annular truncated conical valve seat engaging surface 51 extends upwardly and outwardly from the disc base surface 50. When the valve seat disc 18 and valve stem 17 are properly mounted in valve housing 11, seat engaging surface 51 may be positioned in sealing engagement with valve seat 12a. The outer surface of valve disc 18 extends upwardly from seat engaging surface 51 and includes cylindrical, skirt, and flange surfaces between the seat engaging surface 51 and an upper annular flange surface 52. Flat annular surface 52 defines the periphery of valve stem mounting hole 53. Mounting hole 53 is cylindrical and extends axially through a substantial portion of the stem disc 18 from the upper annular flange 52. Mounting hole 53 includes a generally flat bottom surface 54 upon which a central drill notch surface 54a may be necessarily positioned during formation of the hole. Mediate the bottom surface 54 and the upper annular flange 52, cylindrical surface 53 includes an annular indent groove 55 which is positioned substantially the same distance from upper annular flange 52 as annular indent groove 39 on valve stem 17 is positioned from annular skirt flange 37. Annular indent groove 55 includes a cylindrical base surface and a pair of flat side surfaces perpendicular to the base surface. Groove 55 is adapted to receive the radially outward portion of retaining ring 23. The sidewalls of cylindrical mounting hole 53 form a cylindrical surface in the preferred embodiment. However, the upper portion of the mounting hole 53 may be conically angled radially outwardly without diminishing from the invention.

METHOD OF ASSEMBLY

Referring to FIGS. 1, 2, and 3, the valve stem 17 and disc 18 are assembled in an improved manner in the valve housing 11. In assembling the valve stem and disc combination, first, the retaining ring 23 is constricted and inserted in that constriction form in valve stem mounting hole 53 until it snaps into annular indent groove 55. As shown most clearly in FIG. 3, the diameter of the base surface of groove 55 is larger than the outer diameter of retainer 23, an amount sufficient to provide for expansion of the retaining ring in the groove. Also, the coil spring 24 is positioned in the stem mounting hole 53 with its larger base and preferably positioned on the hole bottom surface.

The valve stem 17 is inserted through the inlet port 12 with the handle mounting 21 extending into valve guide 15a. The threaded portion 20 of valve stem 17 is then turned on the valve guide 15a until the valve disc mounting 22 is positioned in the flow passageway 14 sub-jacent to the valve guide portion 15.

Next, the valve disc 18 is positioned in the flow passageway 14 with the valve seat engaging surface 51 resting on the valve seat 12a such that the valve disc is in rough alignment with the valve stem 17 mounted in valve guide 15a. The valve stem 17 is then turned to move downwardly in valve guide 15a so that the valve stem mounting 22 is inserted into the valve stem mounting hole 53. If the valve stem 17 should be positioned out of alignment with the mounting hole 53 in valve disc 18, the truncated conical surface 40 will force the realignment of the valve stem and valve disc. As the valve stem 17 is turned further to insert the cylindrical wall portion 38 into the stem mounting hole 53, the conical portion 40 spreads the retaining ring 23 and positions it in alignment with the valve stem. It should be noted that as long as the diameter of the distal end 41 of valve stem 17 is smaller than the effective diameter of the retainer ring 23 when positioned in its most offset position in valve disc 18, the conical surface will force the ring into alignment. The valve stem and the retaining ring will not bind during stem insertion as is possible in prior art valve stem-disc assemblies. As the valve stem is moved further into the valve disc, the stem distal end 41 engages the top of the coil spring 24, thus biasing the valve disc 18 against the valve stem 17. At one position during the valve stem insertion, the annular indent groove 39 on valve stem 17 aligns with the annular indent groove 55 on the valve disc 18, thus allowing the retaining ring 23 to snap into the valve stem groove 39 to retain the stem on the valve disc. The valve disc 18 is then securely retained with a loose fit on valve stem 17, and when the valve disc 18 is positioned off of valve seat 12a, spring 24 biases both the stem 17 and the disc 18 against the retainer 23.

While a particular embodiment of the invention has been shown and described, it will be obvious to those skilled in the art that changes and modifications may be made without departing from the invention in its broader aspects. Therefore, the aim in the appended claims is to cover all such changes and modifications as fall within the true spirit and scope of the invention.

We claim:

1. A method of loosely permanently mounting a valve stem on a valve disc in a valve assembly of the type wherein said assembly includes a valve housing having a threaded valve stem guide and a valve seat both axially aligned thereon, said valve stem including a threaded portion mediate the ends thereof, a first annular indent groove positioned around the circumference thereof, and a truncated conical surface at the distal end of said stem, a valve disc being substantially symmetrical and including a hollow cylindrical recess having a second annular indent groove positioned around the circumference thereof, and a portion of said disc defining said cylindrical recess and said second annular indent groove thereon being a single-piece structure, an expandable retaining ring including flat opposed top and bottom surfaces thereon for mounting in said annular grooves, and a coil spring for biasing said disc and said stem against said retaining ring, said method comprising the steps of:
constricting said retaining ring until an outer diameter of same is smaller than a diameter of said disc cylindrical recess;
inserting said retaining ring axially in said cylindrical recess until said ring snaps into said second annular indent groove;
positioning said spring on the bottom of said valve disc cylindrical recess;
threading said valve stem in said valve stem guide;
positioning said valve disc on said valve seat in said housing; then
turning said valve stem in said housing to move said one stem end into said valve disc cylindrical recess which expands said retaining ring in said disc annular groove with said conical distal end of said valve stem, collapses said coil spring in said cylindrical recess, and aligns said stem annular groove with said disc annular groove, whereby said retaining ring snaps into said stem annular groove mounting said disc in biased arrangement with said stem.

2. The method defined in claim 1 wherein
the step of turning said stem in said housing which collapses said spring further includes the step of:
biasing said stem and said disc against opposing sides of said retaining ring.

3. In a valve assembly including an axially extending valve stem and a symmetrical cup-shape valve disc, said valve stem including
a radially extending skirt positioned inwardly adjacent one end thereof for restricting the insertion of said stem in said disc, a first annular indent groove positioned around the circumference of said stem mediate said skirt and said one end thereof a first cylindrical surface on bifurcating said first cylindrical surface, said first groove including a pair of opposed annular surfaces extending perpendicularly inwardly from said first cylindrical surface and a second cylindrical surface of smaller diameter than said first cylindrical surface positioned between said opposed annular surfaces, and a truncated conical surface converging toward said one end of said valve stem,
said cup-shape valve disc including
a hollow cylindrical recess positioned axially therein, said recess including
a second annular indent groove positioned around the circumference of said cylindrical recess, inwardly spatially adjacent an opening thereof, said second groove being positioned for alignment with said first groove when said disc is mounted on said stem, an annular expandable retaining ring positioned in said grooves for matingly engaging said stem and said disc, said ring having flat top and bottom surfaces, and substantially cylindrical inner and outer surfaces defining a rectangular cross section, and a coil spring adapted for mounting between the bottom of said cylindrical recess and the distal end of said stem to bias same against said retaining ring;

an improvement wherein said valve disc is permanently loosely retained on one end of said valve stem by a retaining ring engaging said first and second annular indent grooves and a portion of said disc completely defining said second annular groove is a single-piece structure, and the diameter of a distal end surface on said stem is less than twice the radial distance between the axis of said valve housing and the closest position of the inside surface of said retaining ring when said ring is in the greatest offset mounted position possible in said second groove whereby, the distal surface of said stem cannot catch on said ring during the joinder of said stem and said disc.

4. The valve assembly defined in claim 3 wherein the inner diameter of said first indent groove is of sufficient size to provide a close fit with the inner diameter of said retaining ring when said ring is mounted thereon without imparting stress thereon.

* * * * *